(12) United States Patent
Misawa et al.

(10) Patent No.: US 7,519,753 B2
(45) Date of Patent: Apr. 14, 2009

(54) COMMUNICATION SYSTEM

(75) Inventors: Katsutoyo Misawa, Nukata-gun (JP); Masato Rinnai, Okazaki (JP); Toshihiko Matsuoka, Nukata-gun (JP); Yoshinori Teshima, Toyota (JP); Hideaki Ishihara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 11/519,014

(22) Filed: Sep. 12, 2006

(65) Prior Publication Data

US 2007/0083686 A1 Apr. 12, 2007

(30) Foreign Application Priority Data

Oct. 11, 2005 (JP) ............................... 2005-296217
May 29, 2006 (JP) ............................... 2006-148534

(51) Int. Cl.
*G06F 13/00* (2006.01)
(52) U.S. Cl. .................................................... 710/110
(58) Field of Classification Search ................... 710/110
See application file for complete search history.

(56) References Cited

U.S. PATENT DOCUMENTS 6,006,286 A * 12/1999 Baker et al. .................. 710/22
6,810,453 B2 * 10/2004 Ono et al. ................... 710/107
7,248,061 B2 * 7/2007 Yamamoto et al. .......... 324/705
2003/0045234 A1 * 3/2003 Remboski et al. ............. 455/41
2006/0020372 A1 * 1/2006 Watabe ......................... 701/1
2007/0088969 A1 * 4/2007 Weekley et al. ............. 713/502

OTHER PUBLICATIONS

Robert Boys, Safe-by-Wire: The Leading edge in Vehicle Airbag Control. 2004-01-0205Sae International.*
Safe-by-Wire Plus Automotive Safety Restraints Bus Specification,Sep. 24, 2004, Version 2.0.*
Analog Devices Inc, Safe-byWire Plus,Sep. 24, 2004, version 2.0, pp. 1-25.*

* cited by examiner

*Primary Examiner*—Khanh Dang
*Assistant Examiner*—Christopher A Daley
(74) *Attorney, Agent, or Firm*—Posz Law Group, PLC

(57) ABSTRACT

A communication system includes a master control unit, a plurality of slave control units, and buses connecting the master control unit and the slave control units for the asynchronous communication. When the master control unit starts the communication, each slave control unit transmits a plurality of data bits represented by whether the buses be driven to the master control unit in data transmission periods assigned to the slave control units based on a start of communication, and the master control unit drives the buses to insert a period for supplying power while data bits are being transmitted in the data transmission period. The slave control unit provides a non-driving period, which stops driving the buses, at an end of the data bit transmission period.

16 Claims, 13 Drawing Sheets

COMMUNICATION SYSTEM

CROSS REFERENCE TO RELATED APPLICATION

This application is based on and incorporates herein by reference Japanese Patent Applications No. 2005-296217 filed on Oct. 11, 2005 and No. 2006-148534 filed on May 29, 2006.

FIELD OF THE INVENTION

This invention relates to a communication system which executes an asynchronous communication between a master control unit and a plurality of slave control units connected to the master control unit via buses.

BACKGROUND OF THE INVENTION

An SbW (safe-by-wire) is proposed as one of communication protocols used for wiring data in a vehicle. In the SbW, the power is supplied and the communication is effected by using two wires only for use in those applications where it is desired to lower the probability of breakage in the wiring.

As shown in FIG. 14, one master control unit (e.g., ECU for a vehicle) 1 is connected to a plurality of slave control units 2, for instance 2(1) to 2(6), like a string via buses 3, specifically 3(+) and 3(−). A switch 4 is contained in each slave control unit 2. In case a succeeding slave control unit 2 becomes defective, the switch 4 works to disconnect the bus 3 from the defective slave control unit 2, so that the communication is continued by the normal slave control units 2 only.

FIG. 15 illustrates voltage waveforms with which the master control unit 1 or the slave control unit 2 drives the buses 3 when the data are to be transmitted relying upon the SbW communication. In the SbW, the master control unit 1, first, drives the buses 3 with a voltage level VLP in a power phase, to supply a drive power to the slave control units 2. A data phase that follows the power phase becomes a period in which the master control unit 1 or the slave control unit 2 transmits the data of one bit.

When the master control unit 1 transmits the data in the data phase, the buses 3 are driven to a voltage level of either VL0 or VL1. These voltages levels correspond to the data "0, 1". In a period in which the slave control unit 2 transmits the data, the master control unit 1 drives the buses 3 to the voltage level VL0 in the data phase. The lengths of periods of the power phase and data phase have been specified to be equal.

In this case, if the slave control unit 2 does not drive the buses 3, the voltage level remains at VL0, meaning that the data "0" is transmitted. If the slave control unit 2 drives the buses 3 to VL1 of which the voltage level is lower than VL0, it means that the data "1" is transmitted. If the slave control unit 2 drives the buses 3 to VLS0 of which the voltage level is lower than VL1, it means that an interrupt is generated for the master control unit 1.

FIG. 16A illustrates a data communication between the master control unit 1 and the slave control units 2. The master control unit 1 drives the buses 3 to VLP and VL0 at a length twice as long as a bit period (power phase+data phase) at a communication rate at that moment to transmit SOF (start of frame), which is shown in FIG. 16B and represents the start of communication. With the SOF being transmitted onto the buses 3, the slave control units 2 recognize the start of communication.

Then, the master control unit 1 transmits two data bits, i.e., MSA and SEL. Thereafter, the slave control units 2 acquire a period for transmitting the data. That is, a Slot1_data and a subsequent CRC are data transmission periods of the master control unit 1(1), the CRC (cyclic redundancy check) being an error detection code attached concerning the Slot1_data. Similarly, hereinafter, a Slot2_data, a Slot3_data, - - - , a Slot_n_data are successively transmitted by the other slave control units 2.

The master control unit 1 is learning in advance the number of the slave control units 2 connected to the buses 3. When the data of a bit number corresponding to all slave control units 2 are transmitted, therefore, a series of communication ends. In the SbW, as described above, the slave control unit 2 supplies the power in the power phase while a data bit is being transmitted over two buses 3. By using only two buses 3, therefore, it is allowed to constitute a serial communication system capable of supplying the power.

If it is presumed that the above communication system is applied to an air bag device mounted on a vehicle, the plurality of slave control units 2 are corresponded to the acceleration sensors arranged at various portions of the vehicle. If any acceleration sensor detects the shock of an accident, the detection signal is transmitted from the slave control unit 2 to the master control unit 1. The master control unit 1 therefore sends an ignition instruction to an inflator in the air bag device that is not shown to generate a gas, so that the air bag inflates.

The SbW is a technology which has not been widely employed yet, and the applicant could not find any pertinent prior art document to be quoted.

The above communication system alternately repeats the power phase in which the master control unit 1 drives the buses 3 to supply the power and the data phase in which the slave control unit 2 can drive the buses 3. The SOF that represents the start of communication is, thereafter, output by the master control unit 1 onto the buses 3 followed, however, by no timing signal with which the slave control units 2 can maintain synchronism. That is, the Standards are not specifying how the synchronism be maintained by the slave control units 2 relative to the communication started by the master control unit 1 and, hence, the communication system basically is asynchronous.

Therefore, the slave control units 2 individually measure the periods of the power phase and the data phase to determine the arrival of their own periods for transmitting data, and drive the buses 3 in the data phase. Therefore, if the times measured by the slave control units 2 are deviated, it is probable that the end of data phase overlaps the head of the succeeding power phase. In this case, if the slave control unit 2 drives the buses 3 to either one of VL1 or VLS0 in the data phase and, then, if the master control unit 1 drives the buses 3 to VLP in the power phase, it becomes probable that the drive levels of the buses 3 interfere with each other in the above overlapped periods as shown in FIG. 17 and the communication may fail.

SUMMARY OF THE INVENTION

This invention has an object of providing a communication system which is capable of avoiding interference between the drive levels of the buses when an asynchronous communication is to be executed between the master control unit and a plurality of slave control units connected to the master control unit via buses.

According to one aspect of the present invention, a communication system includes a master control unit, a plurality of slave control units, and buses connecting the master control unit and the slave control units for the asynchronous communication. When the master control unit starts the communication, each slave control unit transmits a plurality of data bits represented by whether the buses be driven to the master control unit in data transmission periods assigned to the slave control units based on a start of communication, and the master control unit drives the buses to insert a period for supplying power while data bits are being transmitted in the data transmission period. The slave control unit provides a non-driving period, which stops driving the buses, at an end of the data bit transmission period.

BRIEF DESCRIPTION OF THE DRAWINGS

The above and other objects, features and advantages of the present invention will become more apparent from the following detailed description made with reference to the accompanying drawings, In the drawings.

DESCRIPTION OF THE PREFERRED EMBODIMENTS

First Embodiment

A first embodiment in which a communication system of the invention is applied to the SbW will now be described with reference to FIGS. 1 to 4.

Figure 1:
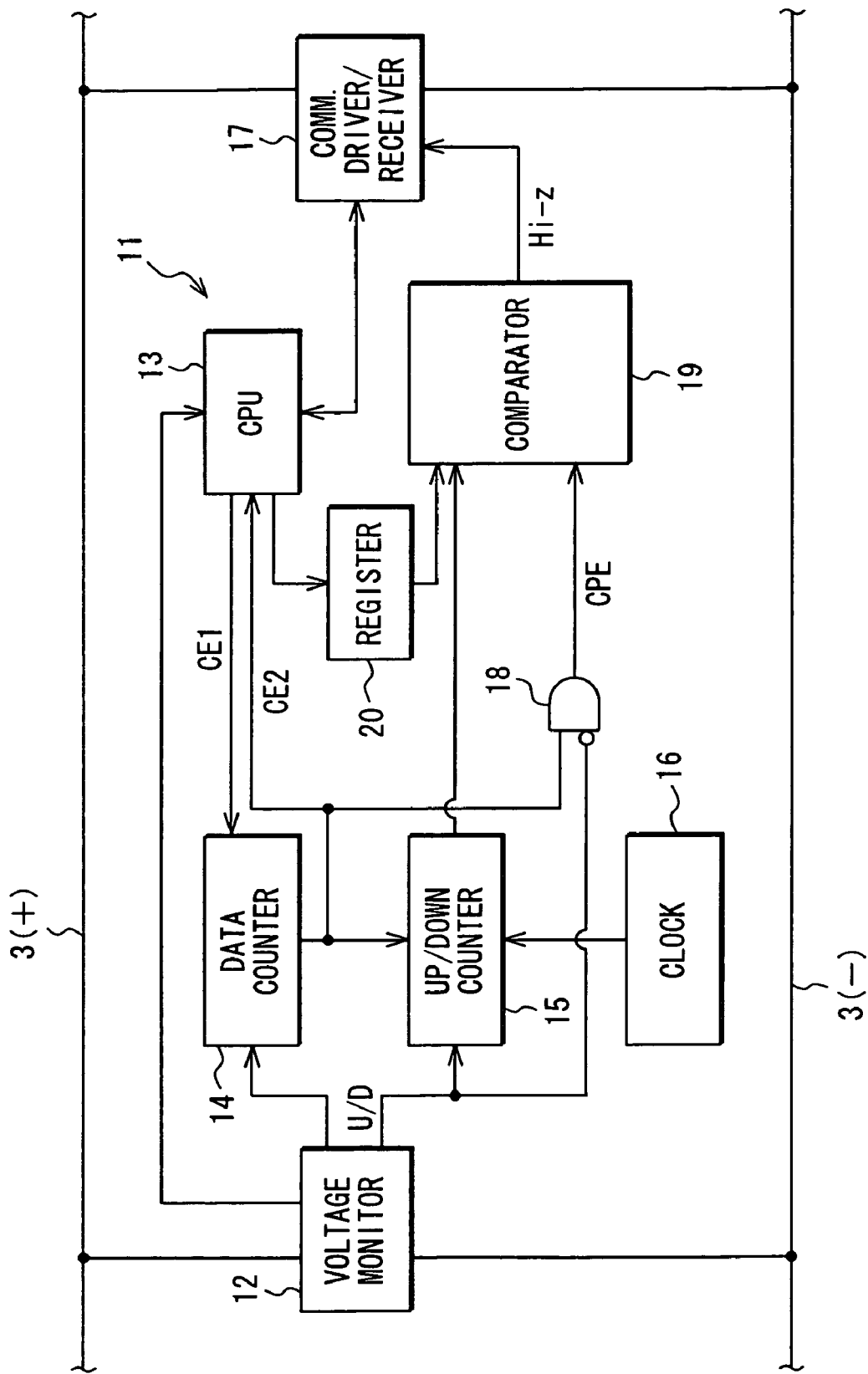
FIG. 1 is a functional block diagram schematically illustrating a slave control unit according to a first embodiment of the present invention.

Referring first to FIG. 1, a voltage monitoring circuit (voltage monitoring means) 12 is connected between buses 3(+) and 3(−) for serial communication. A voltage monitoring circuit 12 monitors a voltage of the buses 3 driven by a master control unit 1 to obtain information with which a slave control unit 11 grasps the communication timing, and is constructed by containing a comparator for comparing the voltage levels. The voltage monitoring circuit 12 monitors whether the drive levels of the buses 3 are normal, and outputs the monitored results to a CPU (microcomputer) 13.

The voltage monitoring circuit 12 sets a voltage threshold value VDC for counting the data to a level slightly higher than VL0, and outputs a one-shot pulse to a data counter 14 every time when the voltage levels of the buses 3 rise to exceed the threshold value VDC. Further, the voltage monitoring circuit 12 produces a U/D change-over signal of a high level to an up/down counter 15 while the voltage levels of the buses 3 are maintained at VLP. When the master control unit 1 no longer drives the buses 3 in the power phase permitting the voltage level to decrease by a predetermined value below VLP, the U/D change-over signal is changed from high to low.

When the count enable signal CE2 given by the data counter 14 is active, the up/down counter 15 executes the counting operation based on count clock signals output from a clock circuit 16. The up-counting operation is executed during the period in which the U/D change-over signal assumes the high level, and the down-counting operation is executed during the period in which the U/D change-over signal assumes the low level.

The CPU 13 drives the buses 3 via a communication driver/receiver 17 to transmit data to the master control unit 1 and receives data transmitted from the master control unit 1 via the communication driver/receiver 17. The electric power transmitted from the master control unit 1 in the power phase is smoothed through a power circuit that is not shown, and is supplied as a drive power to various portions of the slave control unit 11.

Upon detecting the SOF that is transmitted onto the buses 3 from the master control unit 1 via the communication driver/receiver 17, the CPU 13 activates the count enable signal CE1 that is given to the data counter 14. The data counter 14 starts counting the pulses given from the voltage monitoring circuit 12, i.e., starts counting the number of data transmitted onto the buses 3 from a moment the SOF is output. When the counted value becomes the one that corresponds to the start of period for transmitting the data by the slave control unit 11, the count enable signal CE2 that is given to the up/down counter 15 is activated. The count enable signal CE2 is given to the CPU 13 as well as to one input terminal of an AND gate 18.

A comparison circuit 19 is constructed by a magnitude comparator, compares a value counted by the up/down counter 15 with a data value set to a setpoint register 20, and produces an Hi-Z instruction to the communication driver/receiver 17 when the two become in agreement with each other. Upon receipt of the Hi-Z instruction in a state where the buses 3 have been driven to any one of VL0, VL1 or VLS0 in the data phase, the communication driver/receiver 17 discontinues the driving at that moment, and places the output in a high-impedance state.

Here, however, the comparison circuit 19 executes the above operation of comparison when the comparison enable signal (CPE) given from the AND gate 18 is active. The CPU 13 writes suitable data into the setpoint register 20 and sets them therein. A U/D change-over signal is given from the voltage monitoring circuit 12 to another negative logic input terminal of the AND gate 18.

Figure 3:
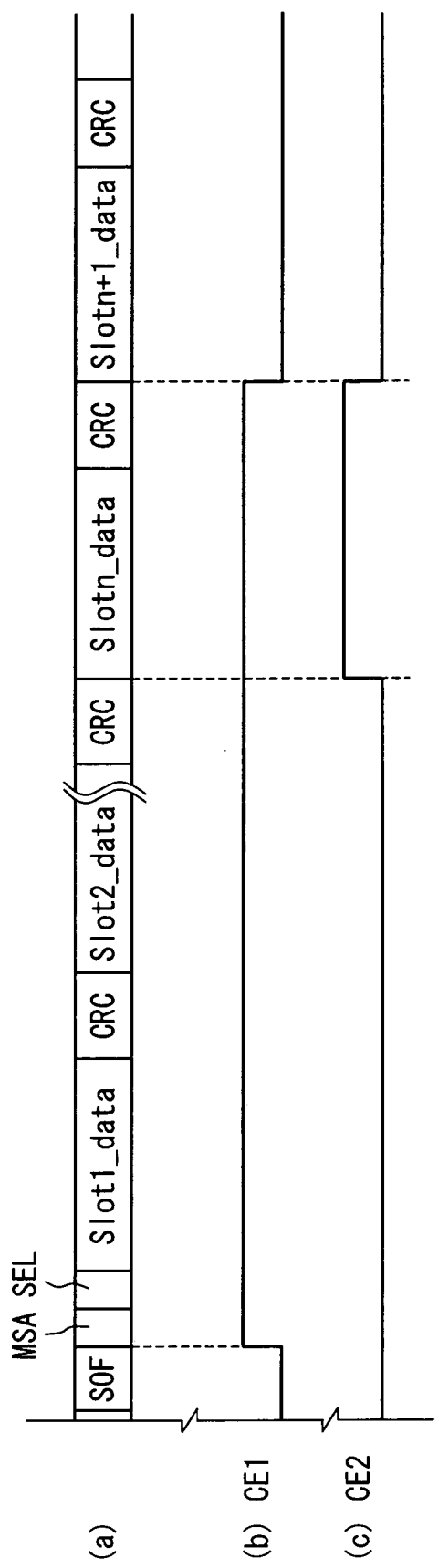
FIG. 3 is a timing chart illustrating a state where count enable signals CE1 and CE2 are output from a moment of starting the communication.
Figure 4:
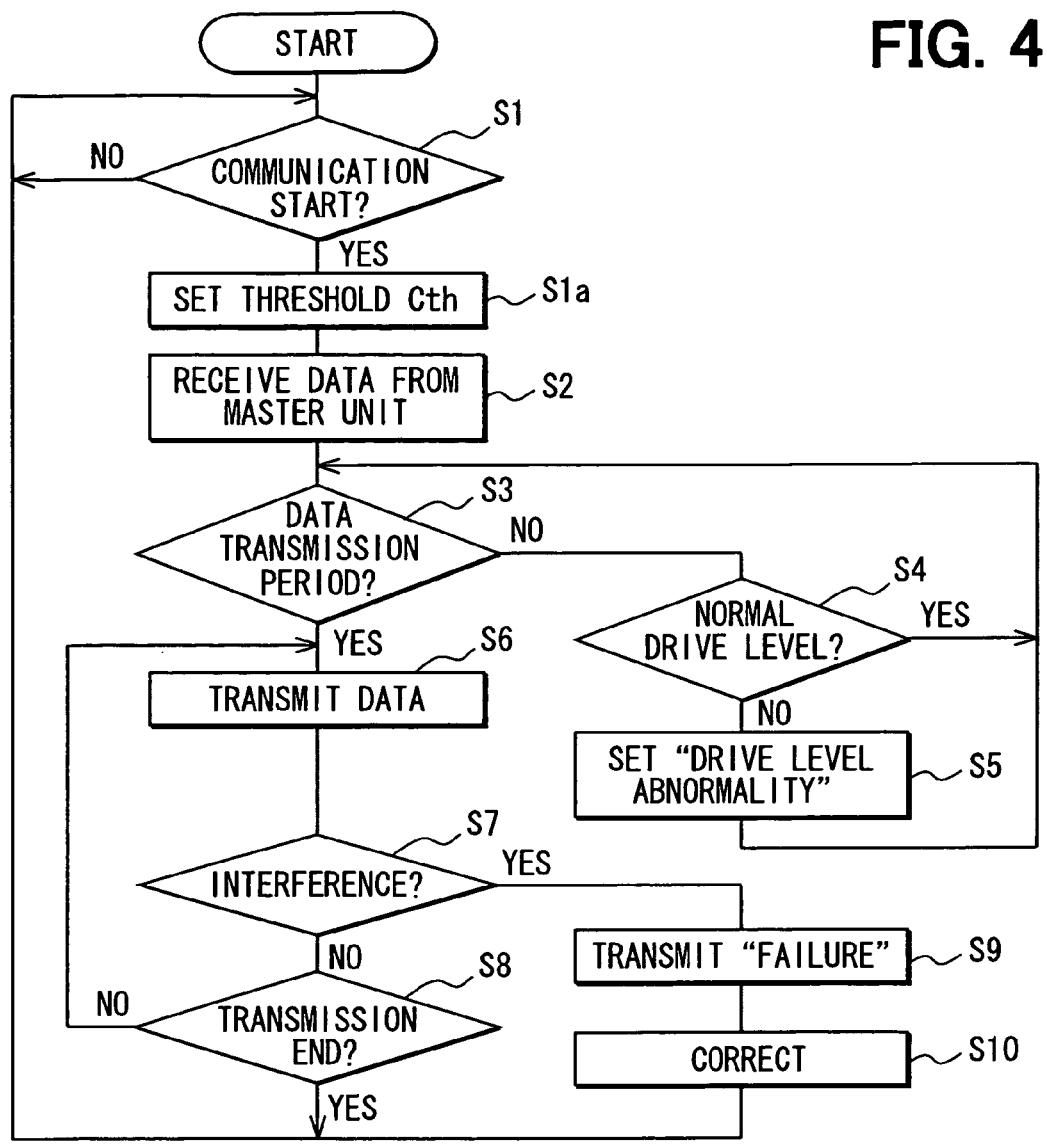
FIG. 4 is a flowchart illustrating the control operation executed by a CPU in the slave control unit.

Next, the operation of this embodiment will be described with reference to FIGS. 2, 3 and 4. FIG. 4 is a flowchart illustrating a part of control operation executed by the CPU 13 in the slave control unit 11. The CPU 13, first, stands by until the SOF is transmitted onto the bus 3 from the master control unit 1 (step S1). When the SOF is transmitted and the communication starts (YES), the CPU 13 determines the communication rate by making a reference to the communication waveform on the buses 3, writes a threshold value Cth corresponding to the communication rate into the setpoint register 20 and sets it therein (step S1a).

Here, the pulse width of, for example, SOF is measured to determine the real communication rate (bit rate). For instance, when the communication rate has been set to 200 kbps, a transmission period of 1 bit becomes 5 μs. The data phase is one-half thereof, i.e., 2.5 μs, and the data of a counted value (i.e., corresponding to the counted clocks output from the clock circuit 16) corresponding to 0.25 μs which is one-tenth thereof are set to the setpoint register 20.

Next, the CPU 13 receives data of 2 bits transmitted from the master control unit 1 (step S2). Further, when the SOF is transmitted, the CPU 13 activates (renders high) the count enable signal CE1 as described above.

Next, the CPU 13 stands by until the data counter 14 activates the count enable signal CE2 (step S3, NO). During this period, the voltage monitoring circuit 12 makes a reference to the voltage monitor signal, and monitors whether the drive levels of the buses 3 are proper (step S4). The drive levels monitored here are drive level VLP or VL0 by the master control unit 1, or are drive level VL1 or VLS0 by other slave control unit, and whether they are within the specified allowable ranges is monitored.

For example, if VLP is greatly lowered, it can be estimated that the driver in the master control unit 1 or in the slave control unit 11 is defective, or the power voltage itself is abnormal in the system. When every drive level is normal (YES) at step S4, the routine returns to step S3. If any one of the drive levels is abnormal (NO), the setting is so effected as to transmit to the master control unit 1 that the drive levels are abnormal (step S5). That is, an interrupt is generated for the master control unit 1, or the occurrence of the above state is stored in the register, and a message stating the above abnormal condition is transmitted when its own data transmission period has arrived.

Figure 2:
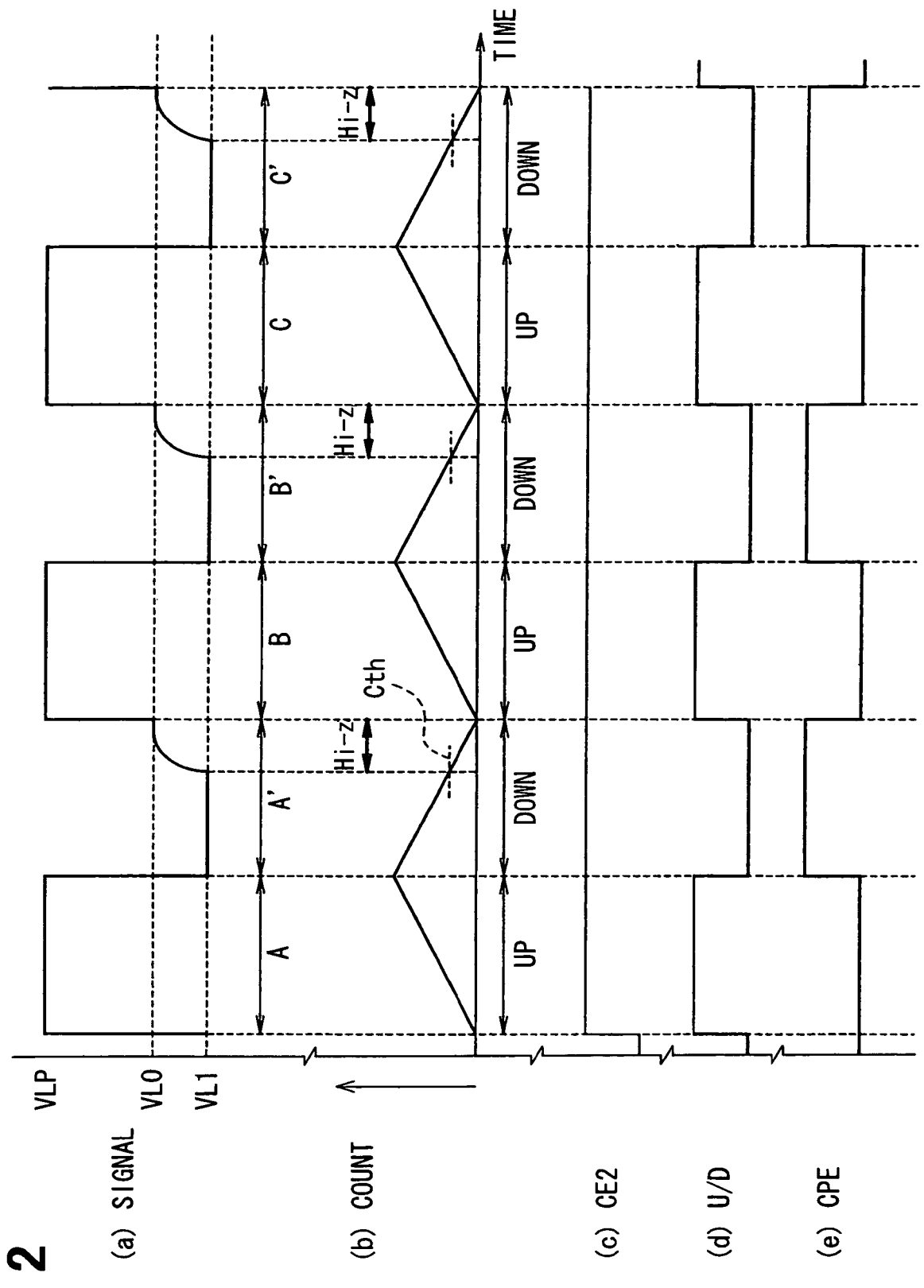
FIG. 2 is a timing chart illustrating a state of driving communication buses.

At step S3, if the count enable signal CE2 is activated upon counting a predetermined number of transmitted data bit by the data counter 14 (YES, see (c) of FIG. 2), the CPU 13 starts transmitting the data to the master control unit 1 (step S6). That is, when the data "0" is to be transmitted, the buses 3 are not driven (therefore, the levels of the buses 3 become VL0 due to the master control unit 1) and when the data "1" is to be transmitted, the buses 3 are driven to VL1.

At this moment as shown in (b) of FIG. 2, when the up/down counter 15 is starting the counting operation, the up-counting is executed while the voltage monitoring circuit 12 is maintaining the U/D change-over signal at the high level. When the U/D change-over signal changes into the low level, the down-counting is executed from this moment. Therefore, in the period in which the master control unit 1 is supplying the power in the power phase, the counter 15 effects the up-counting making it possible to measure the period of the power phase. When the master control unit 1 discontinues the supply of power and the power phase shifts to the data phase causing the counter 15 to effect the down-counting, the counting period until the counted value reaches "0" becomes equal to the power phase, i.e., the period of data phase becomes equal to the power phase.

Here, as shown in (e) of FIG. 2, the comparison enable signal (CPE) produced by the AND gate 18 in response to the data phase becomes active, and the comparison circuit 19 executes the operation for comparison. As the down-counted value gradually decreases and comes in agreement with the data value that has been set to the setpoint register 20, the comparison circuit 19 produces a Hi-Z instruction to the communication driver/receiver 17 (see (b) of FIG. 2). In case the buses 3 had been driven to the level VL1, the communication driver/receiver 17 no longer drives the buses 3, and places an output in the high-impedance state. As shown in (a) of FIG. 2, therefore, the levels of buses 3 change from VL1 to VL0, and rise to VLP as the data phase shifts to the power phase.

That is, the comparison circuit 19 produces the Hi-Z instruction at the end of the data phase (during the period of 0.25 μs in the above example), and this period (non-driving period) becomes a buffer period until the power phase where the buses 3 are no longer driven by the slave control unit 11.

Referring again to FIG. 4, the CPU 13 in the slave control unit 11 transmits the data bit by bit at step S6 until the data are all transmitted (step S8, NO). During this period, it is determined at step S7 if the drive levels of the buses 3 are interfering.

Though the high-impedance period is provided at the end of the data phase as described above, it is probable that the drive level by the slave control unit 11 in the data phase may interfere with the drive level by the master control unit 1 in the power phase in case the communication state is deviated from the communication state that is really carried out. When the drive levels interfere, it is presumed that the levels of the buses 3 lie between VLP and VL0.

Therefore, the CPU 13 determines whether the levels are interfering with each other by making a reference to the result monitored by the voltage monitoring circuit 12 at step S7. When no interference is taking place (NO), the routine proceeds to step S8. When the interference is taking place (YES), information representing communication failure (communication has failed) is transmitted to the master control unit 1 (step S9). When the data value set to the setpoint register is so updated as to increase (step S10), the routine returns back to step S1.

In the communication system employing SbW according to this embodiment as described above, the slave control unit 11 provides a non-driving period in which the buses 3 are not driven at the end of the data phase. Therefore, even when grasping the communication timing is deviated on the side of the slave control unit 11, a margin can be imparted by the non-driving period making it possible to avoid the overlapping of driving periods of the buses 3 relative to the master control unit 1.

The slave control unit 11 causes the up/down counter 15 to start the counting operation at a moment of starting its own data transmission period, and the up/down counter 15 effects the up-counting operation during the power phase and effects the down-counting operation during the data phase. When the value counted down by the counter 15 reaches the value that has been set to the setpoint register 20, the slave control unit 11 stops driving the buses 3. Therefore, the power phase and the data phase maintain an isochronism making it possible to more reliably avoid the interference of drive levels relative to the master control unit 1.

In this case, the slave control unit 11 varies the threshold value set to the setpoint register 20 depending upon the communication rate set by the SOF produced by the master control unit 1 to thereby set the length of the non-driving period.

Therefore, the non-driving period can be adjusted to become proper depending upon the communication rate, e.g., the non-driving period can be adjusted to become shorter with an increase in the communication rate.

When the voltage of the buses 3 monitored by the voltage monitoring circuit 12 decreases down to the predetermined level due to the interruption of power from the master control unit 1, the operation of the up/down counter 15 is changed over to the down-counting operation. Therefore, the slave control unit 11 starts the data phase after having reliably recognized the end of the power phase.

When the drive voltages (VLP, VL0, VL1, VLS0) of the buses 3 are deviated out of the allowable range, the slave control unit 11 transmits the fact that the drive voltage is abnormal to the master control unit 1. Namely, this fact is transmitted to the master control unit 1 to cope with the situation. Further, upon determining that the voltage of the buses 3 in the data phase is of a level that interferes, the slave control unit 11 transmits the occurrence of a communication error to the master control unit 1; i.e., the master control unit 1 is informed of the occurrence of interference of the drive levels. In this case, further, the slave control unit 11 updates and adjusts the data value in the setpoint register 20 so that the non-driving period is lengthened. Therefore, interference of the drive levels is avoided.

Besides, the slave control unit 11 determines the start of its own data transmission period by counting the number of data bits transmitted onto the buses 3 from a moment the master control unit 1 has instructed the start of communication. Therefore, the time needs not be precisely measured until the start of the above period, and the construction can be simplified.

Second Embodiment

In a second embodiment, the slave control unit 11 (not shown) is so constructed that a maximum value counted up by the up/down counter 15 is latched, and the latched data is read by the CPU 13. In this case, the break of the U/D change-over signal may be utilized as the latch signal. By using the above construction as a prerequisite, there is added a function that is realized by the software of the CPU 13.

Figure 5:
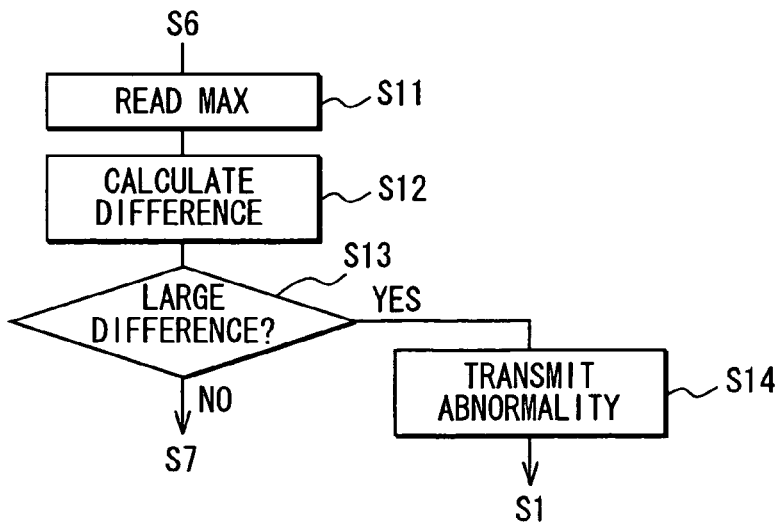
FIG. 5 is a flowchart illustrating a part of the control operation according to a second embodiment of the invention.

In operation, as shown in FIG. 5, after having executed the processing of step S6, the CPU 13 reads a maximum value counted up by the counter 15 (step S11). The data value is written into a memory that is not shown and is stored therein. Thereafter, the CPU 13 operates a difference between the value counted and stored in the memory last time and the value that is counted this time (step S12), and determines whether the difference is greater than a predetermined value (step S13). When the value is smaller than the predetermined value (NO), the routine shifts to step S7. When the value is not smaller than the predetermined value (YES), information representing "transmission interval is abnormal" is transmitted to the master control unit 1 (step S14), and the routine returns to step S1.

That is, a maximum value counted up by the counter 15 corresponds to the length of period of power phase. Therefore, if the maximum value that is counted greatly varies for every bit, then, it means that the bit rate is not constant but is varying due to some cause. Therefore, the occurrence of abnormal condition is transmitted to the master control unit 1 to cope with the situation.

According to the second embodiment as described above, the slave control unit 11 detects a difference in the counted values for every data bit when the operation of the up/down counter 15 is changed over to the down-counting, and the fact that the transmission period is abnormal is transmitted to the master control unit 1 when the difference becomes larger than the predetermined value. Therefore, an abnormal management of the communication timing is transmitted to the master control unit 1 to cope with the situation.

Third Embodiment

Figure 6:
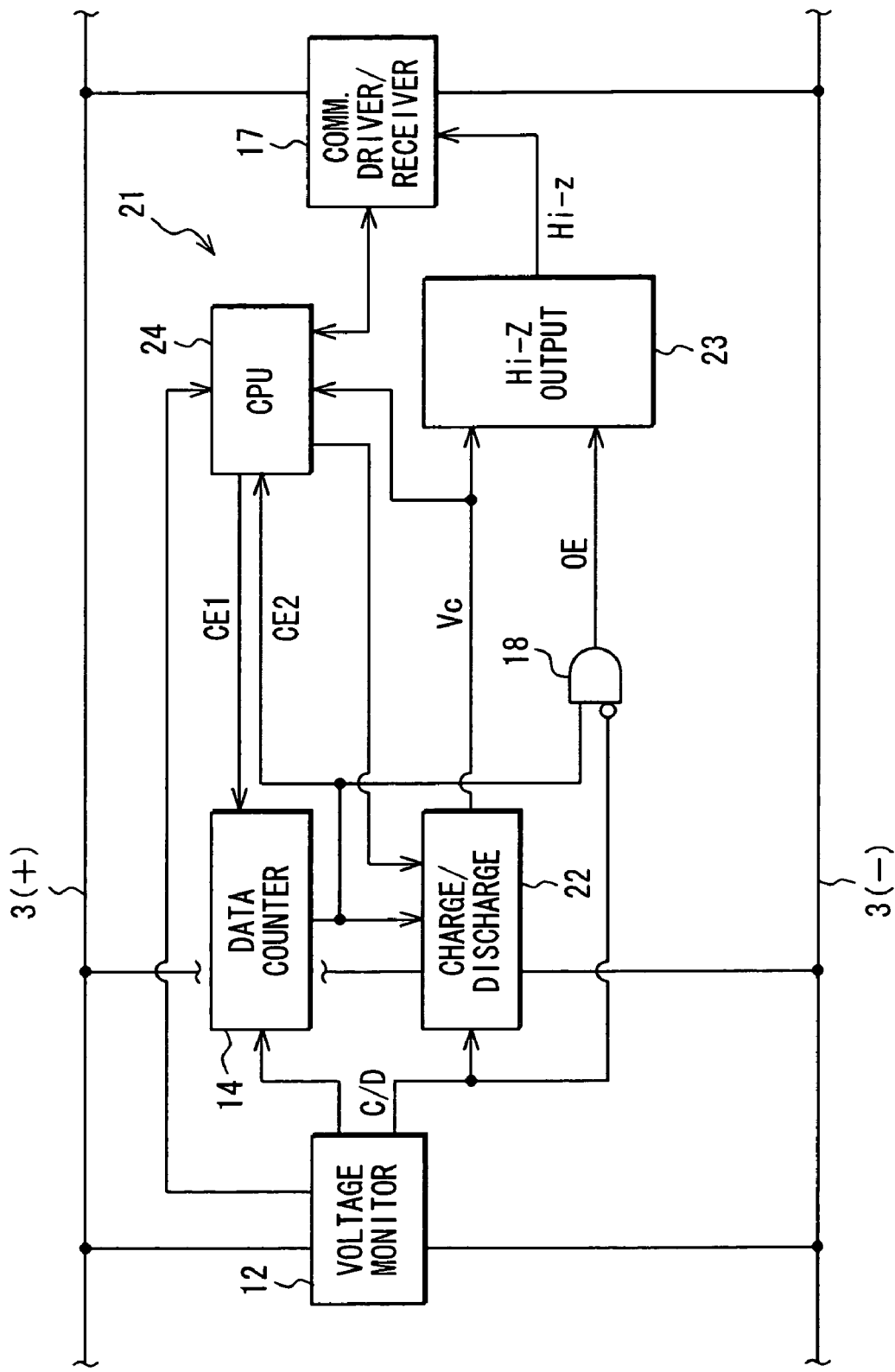
FIG. 6 is a functional block diagram schematically illustrating a slave control unit according to a third embodiment of the invention.

In a third embodiment, as shown in FIG. 6, the slave control unit 21 is provided with a charging/discharging circuit 22 instead of the up/down counter 15 and the clock circuit 16 in the slave control unit 11 of the first embodiment, and is, further, provided with an Hi-Z instruction output circuit 23 instead of the comparison circuit 19 and the setpoint register 20.

The charge/discharge change-over control of the charging/discharging circuit 22 is executed by a signal which in the first embodiment is produced by the voltage monitoring circuit 12 as an up/down change-over signal. Further, a CPU 24 which substitutes for the CPU 12 operates to change over a charging and discharging time constants of the charging/discharging circuit 22. That is, in the third embodiment, the timing for providing a non-driving period at the end of the data phase is managed based on the charge/discharge control executed by the charging/discharging circuit 22.

Figure 7:
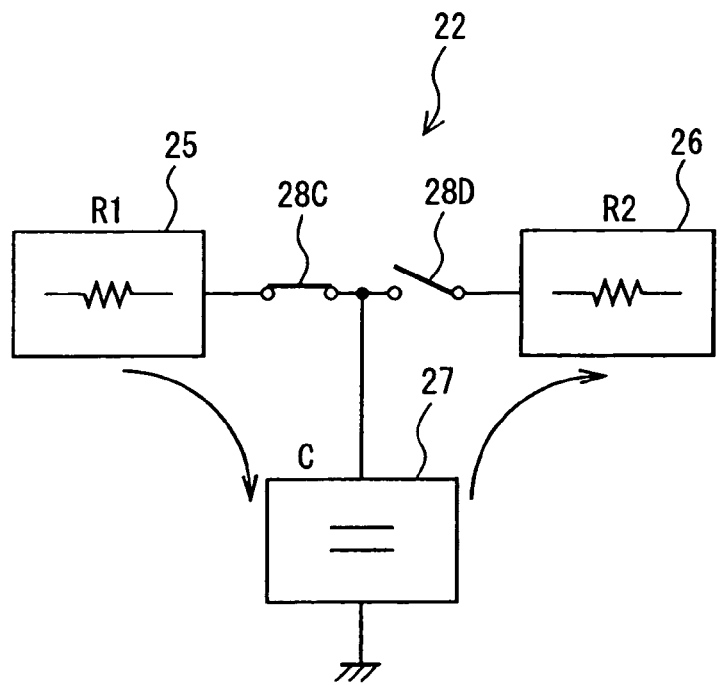
FIG. 7 is a model diagram illustrating a charging/discharging circuit.

The charging/discharging circuit 22 is constructed, as modeled in FIG. 7, by a charging time constant adjust circuit 25, a discharging time constant adjust circuit 26, a capacitor 27, and charge/discharge change-over switches 28C and 28D. The capacitor 27 is electrically charged as it is impressed, via the charging time constant adjust circuit 25, with a power voltage that is applied to the buses 3, and the electric charge accumulated therein is discharged into ground via the discharging time constant adjust circuit 26. The time constant of the charging time constant adjust circuit 25 has been set to be greater than that of the discharging time constant adjust circuit 26.

Figure 8:
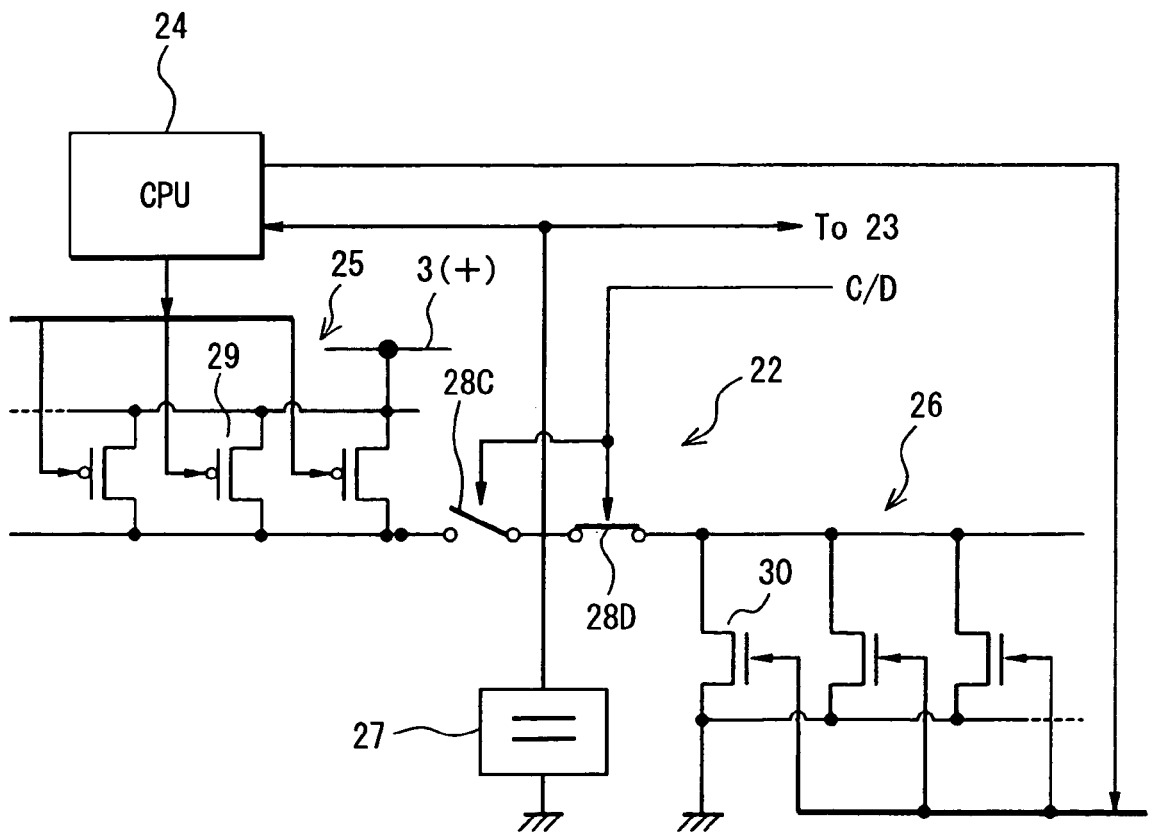
FIG. 8 is a circuit diagram illustrating in detail the charging/discharging circuit.

FIG. 8 is a diagram illustrating in detail the charging/discharging circuit 22. The charging time constant adjust circuit 25 is constructed by connecting a plurality of P-channel MOSFETs 29 in parallel between the communication bus 3(+) and the switch 28C of the charging side, and the discharging time constant adjust circuit 26 is constructed by connecting a plurality of N-channel MOSFETs 30 in parallel between the switch 28D of the discharging side and the ground (communication bus 3(−)). The exclusive turn on/off of the switches 28C and 28D are executed by charge/discharge change-over signals output from the voltage monitoring circuit 12, and the switch 28C on the charging side is turned on during a period in which the above signal assumes the high level and the switch 28D on the discharging side is turned on during a period in which the above signal assumes the low level.

The CPU 24 adjusts the charging time constant and the discharging time constant of the capacitor 27 depending upon how many FETs 29 on the charging side or how many FETs 30 on the discharging side are turned on simultaneously. Namely, if an increased number of FETs are turned on simultaneously, a parallel resistance due to on-resistances of FETs decreases and the time constant decreases, too. The terminal voltage of the capacitor 27 is monitored by an instruction output circuit 23 and by the CPU 24. When a comparator (not shown) that is incorporated detects a terminal voltage that is near 0 V at the time when the capacitor 27 is discharged during a period in which the AND gate 18 produces an output enable signal OE (CPE in the first embodiment), the AND gate 18 produces an Hi-Z instruction to the communication driver/receiver 17.

Figure 9:
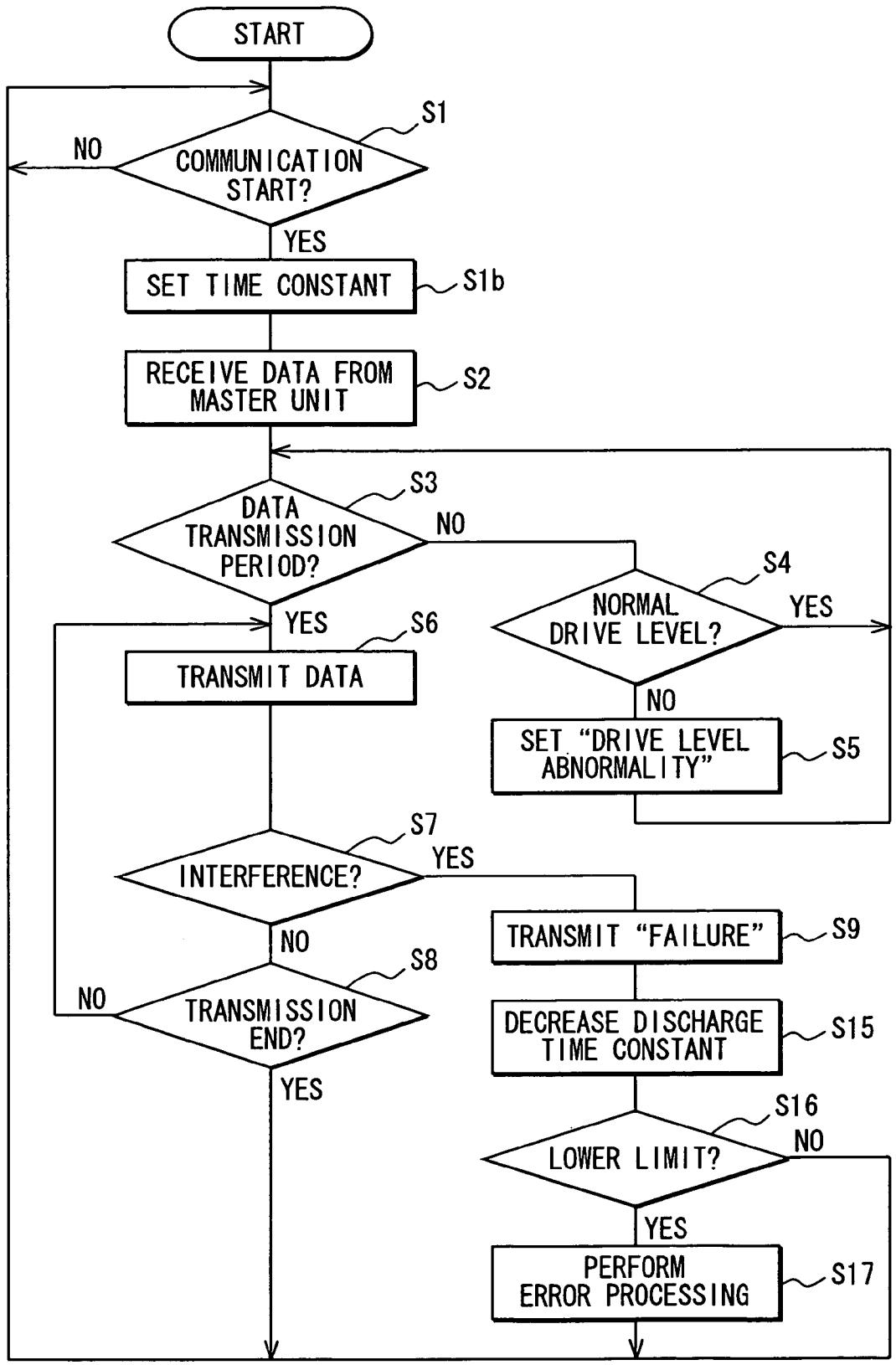
FIG. 9 is a flowchart illustrating the control operation according to the third embodiment.
Figure 10:
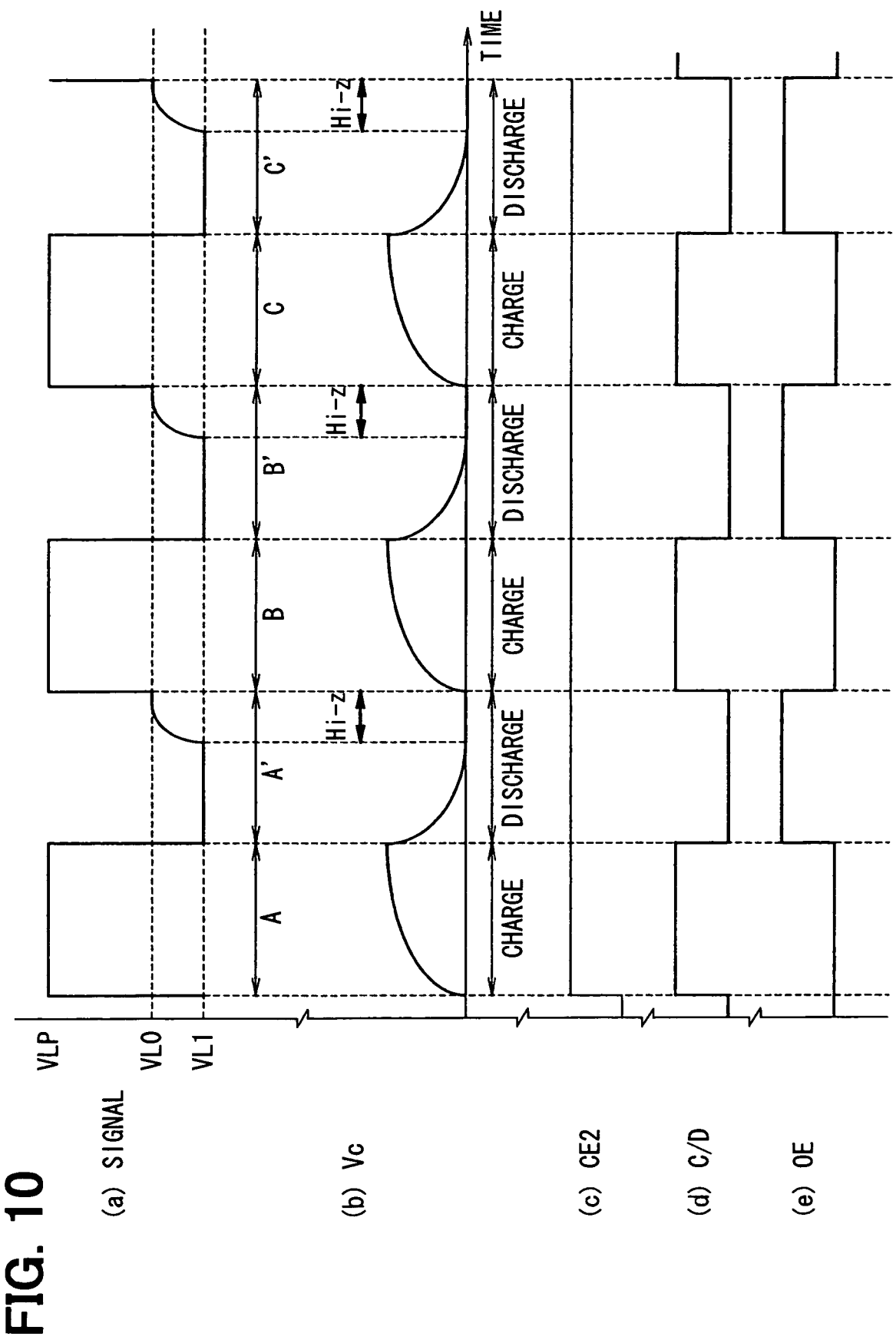
FIG. 10 is a timing chart illustrating a state of driving communication buses.

Next, the operation of the third embodiment will be described with reference also to FIGS. 9 and 10. FIGS. 9 and 10 are diagrams corresponding to FIGS. 4 and 2, respectively. When the SOF is transmitted at step S1 to start the communication (YES), the CPU 24 determines the communication rate, and sets the numbers of FETs 29 and 30 that are to be turned on simultaneously in the charging/discharging circuit 22 to accomplish charging and discharging time constants that meet the communication rate (step S1b). That is, when the communication rate is high, the charging and discharging time constants are set to be small. The subsequent steps S2 to S9 are executed in the same manner as those of the first embodiment.

Here, in the slave control unit 21 which is in the data transmission period, the capacitor 27 in the charging/discharging circuit 22 is electrically charged through the charging time constant adjust circuit 25 and the charging switch 28C and, hence, its terminal voltage increases as shown in (c) of FIG. 10. When the power phase ends, the voltage monitoring circuit 12 changes the charge/discharge change-over signal from the high to the low. Therefore, the charging switch 28C is turned off, the discharging switch 28D is turned on, and the electric charge accumulated in the capacitor 27 is discharged through the discharging time constant adjust circuit 26.

When the terminal voltage of the capacitor 27 approaches 0 V, the instruction output circuit 23 produces an Hi-Z instruction, and the communication driver/receiver 17 stops driving the bus 3, and places the output in the high-impedance state. As described above, since the charging time constant is larger than the discharging time constant, the discharging time of the capacitor 27 becomes shorter than the charging time at all times, and the non-driving period is maintained due to a time differential between the two.

In FIG. 9, when the drive levels of the bus 3 interfere each other (step S7, YES) and step S9 is executed, the CPU 24 adjusts the discharging time constant in the discharging time constant adjust circuit 26 so as to further decrease, i.e., an increased number of FETs 30 are turned on simultaneously (step S15). It is, then, determined if "the number that turns on simultaneously" that is set is smaller than a predetermined lower limit of discharging time constant (step S16). If the number is not smaller than the lower limit (NO), the routine returns to step S1. If the number is smaller than the lower limit (YES), an error processing is executed based upon the event (step S17), and the routine returns to step S1.

That is, at step S16, a case where the discharging time constant becomes smaller than the lower limit stands for a case where a ratio of the non-driving period is too high in the data phase, and the data transmission (bus driving) time by the slave control unit 21 may not be properly maintained. Namely, since the normal communication is not guaranteed, the "error processing" at step S17 transmits error representing the above event to the master control unit 1 like at step S9 or the slave control unit 21 by itself informs the error.

According to the third embodiment as described above, the slave control unit 21 electrically charges the capacitor 27 via the charging time constant circuit 25 and the discharging time constant circuit 26 during a period in which the master control unit 1 is supplying the power in its own data transmission period, and discharges the capacitor 27 in the period in which the slave control unit 21 transmits data bits by itself. The time constant circuits 25 and 26 are so set that the charging time constant becomes greater than the discharging time constant, and driving the bus 3 is discontinued when the terminal voltage of the capacitor 27 at the time of discharge becomes smaller than the threshold value, making it possible to maintain the non-driving period depending upon a difference between the charging time and the discharging time.

In this case, when the master control unit 1 stops supplying the power and the voltage of the bus 3 decreases to a predetermined level, the slave control unit 21 starts discharging the capacitor 27. Therefore, the charge/discharge of the capacitor 27 can be changed over at a suitable timing.

Further, when it is determined that the voltages of the buses 3 are at the interfering levels during the data bit transmission period, the slave control unit 21 adjusts the non-driving period so as to be lengthened, making it possible to avoid the occurrence of interference of the drive levels between the master control unit and the slave control unit. When the length of the period has exceeded the upper limit as a result of adjusting the non-driving period, the slave control unit 21 transmits the occurrence of communication error to the master control unit 1. Namely, the above fact is transmitted to the master control unit 1, and a measurement is taken such as halting the communication.

Fourth Embodiment

Figure 11:
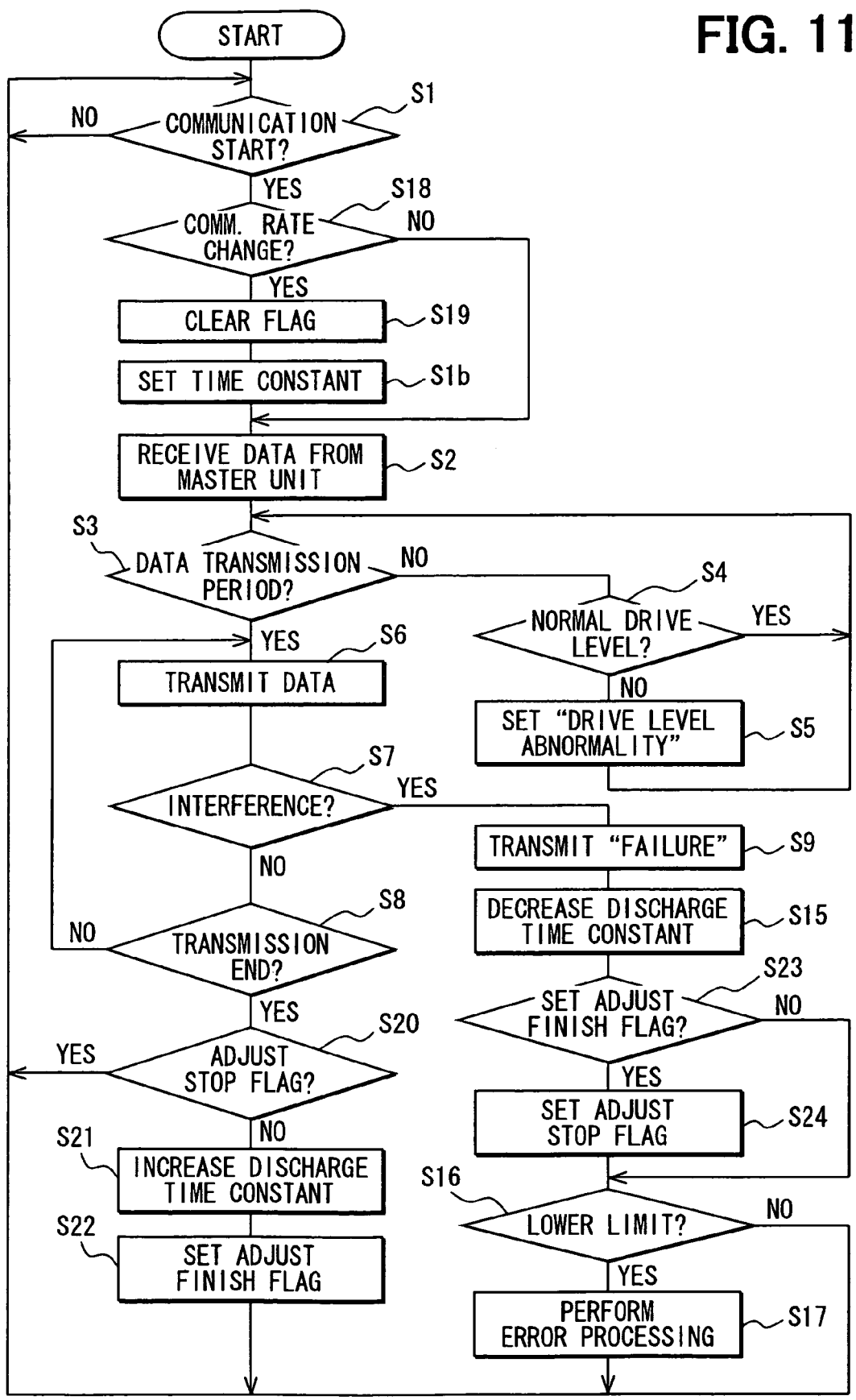
FIG. 11 is a flowchart illustrating the control operation according to a fourth embodiment of the invention.

In a fourth embodiment, as shown in FIG. 11, after having executed the processing of step S1, the CPU 24 determines whether the communication rate represented by SOF has been changed by the rate exhibited last time (step S18). If it has not been changed (NO), the routine proceeds to step S2. In this case, it is presumed that the state at step S1b that has been executed is maintained. If the communication rate has been changed (YES), the flag used for the processing is cleared (step S19) and, thereafter, the routine shifts to step S1b.

When the data transmission period of the slave control unit 21 ends (step S8, YES), the CPU 24 makes a reference to the flag storage region in the internal memory, makes sure the condition of setting the adjustment stop flag, and adjusts the time constant of the discharging time constant circuit 26 so as to be increased by one step (step S21) if the flag has not been set (NO). Then, upon setting, in the storage region, the adjustment finish flag which is for storing the fact that the adjustment has been done (step S22), the routine shifts to step S1. If the adjustment stop flag has been set at step S20 (YES), the routine readily shifts to step S1.

That is, when the determination is rendered to be YES at step S8, it means that the non-driving period set based on the discharging time constant set at step S1b did not cause interference of drive levels of the buses 3. In this case, therefore, there will be no problem even if the non-driving period is further shortened. If the non-driving period is undesirably long, the period in which the slave control unit 21 drives the data may be eroded and the data may not be normally transmitted to the master control unit 1. Therefore, the discharging time constant is adjusted so as to be further increased to shorten the non-driving period.

As a result of having effected the adjustment as described above, it becomes probable that the drive levels of the buses 3 may interfere (step S7, YES). In that case, steps S9 and S15 are executed in the same manner as in the third embodiment, the non-driving period is adjusted again so as to be lengthened and, thereafter, it is determined if the adjustment finish flag has been set (step S23).

If the above flag has been set at this moment (YES), no adjustment is necessary for further shortening the non-driving period unless the communication rate is changed. At subsequent step S24, therefore, the adjustment stop flag is set and the routine shifts to step S16. If the adjustment finish flag has not been set at step S23 (NO), the routine readily shifts to step S16.

When step S20 is attained in the communication of the next and subsequent times after having set the adjustment stop flag as described above, determination is rendered to be YES, and step S21 is not executed. It, therefore, means that the length of the non-driving period is suitably set at that moment.

According to the fourth embodiment as described above, when there continues a state where the drive levels do not interfere within the data bit transmission period a predetermined number of times, the slave control unit 21 adjusts the non-driving period so as to be shortened making it possible to optimize the non-driving period.

Fifth Embodiment

Figure 12:
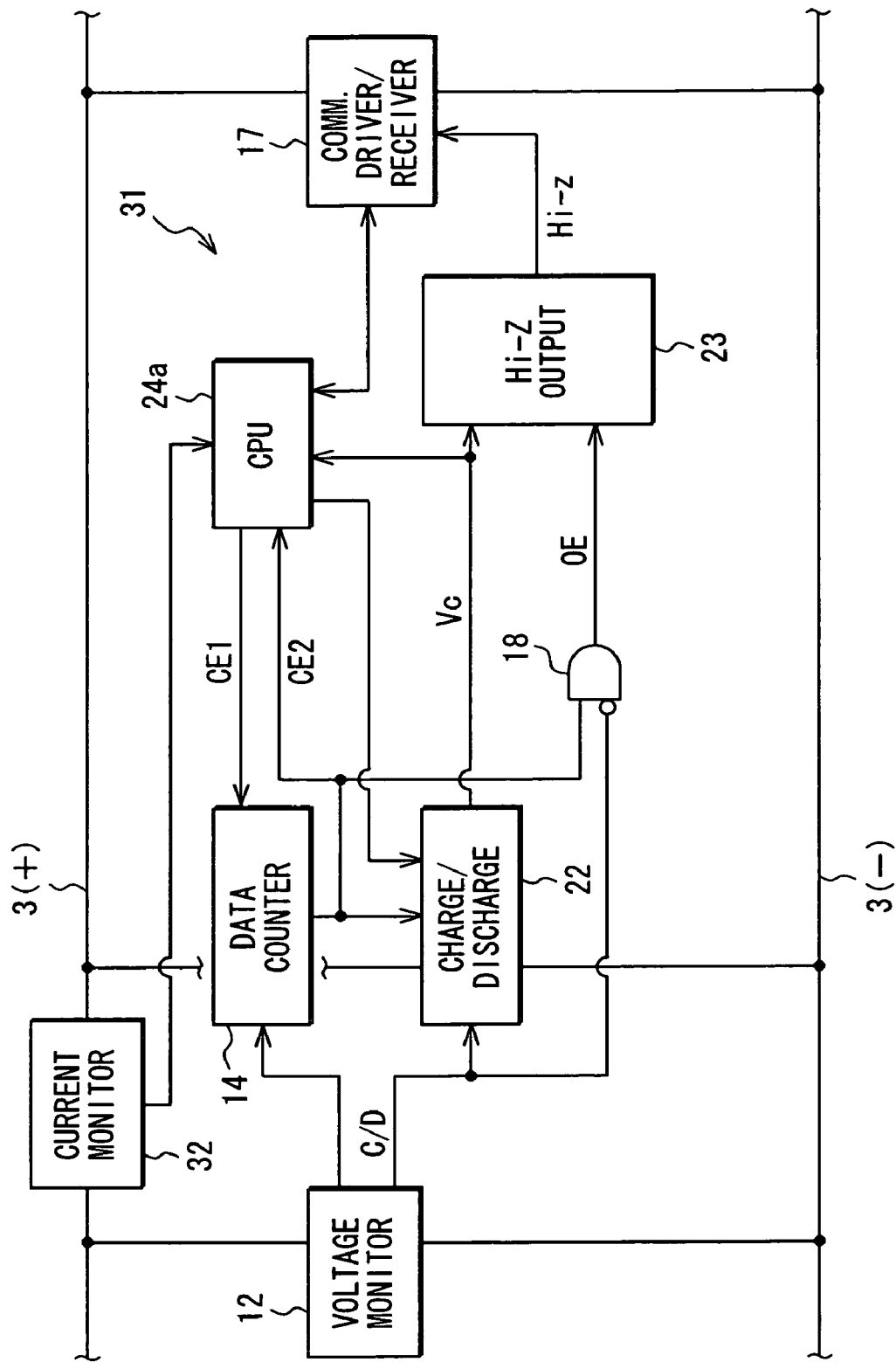
FIG. 12 is a functional block diagram schematically illustrating a slave control unit according to a fifth embodiment of the invention.

In a fifth embodiment, as shown in FIG. 12, in a slave control unit (communication equipment) 31, a CPU 24a detects the interference of drive levels of the buses relying on a change in the driving current of the buses 3 detected by a current monitoring circuit 32 via the bus 3(+). When the drive levels have interfered, the driving current varies abnormally. This abnormal variation is detected. At steps S4 and S7 shown in FIG. 9, therefore, the CPU 24a makes a reference to the output state of the current monitoring circuit 32 and determines whether the driving current is abnormally varying.

According to the above fifth embodiment, when the occurrence of level interference is determined based on a variation in the bus current in the data bit transmission period, the slave control unit 31 transmits the occurrence of communication error to the master control unit 1 and adjusts the non-driving period so as to be lengthened to obtain the same effect as that of the third embodiment.

Sixth Embodiment

Figure 13:
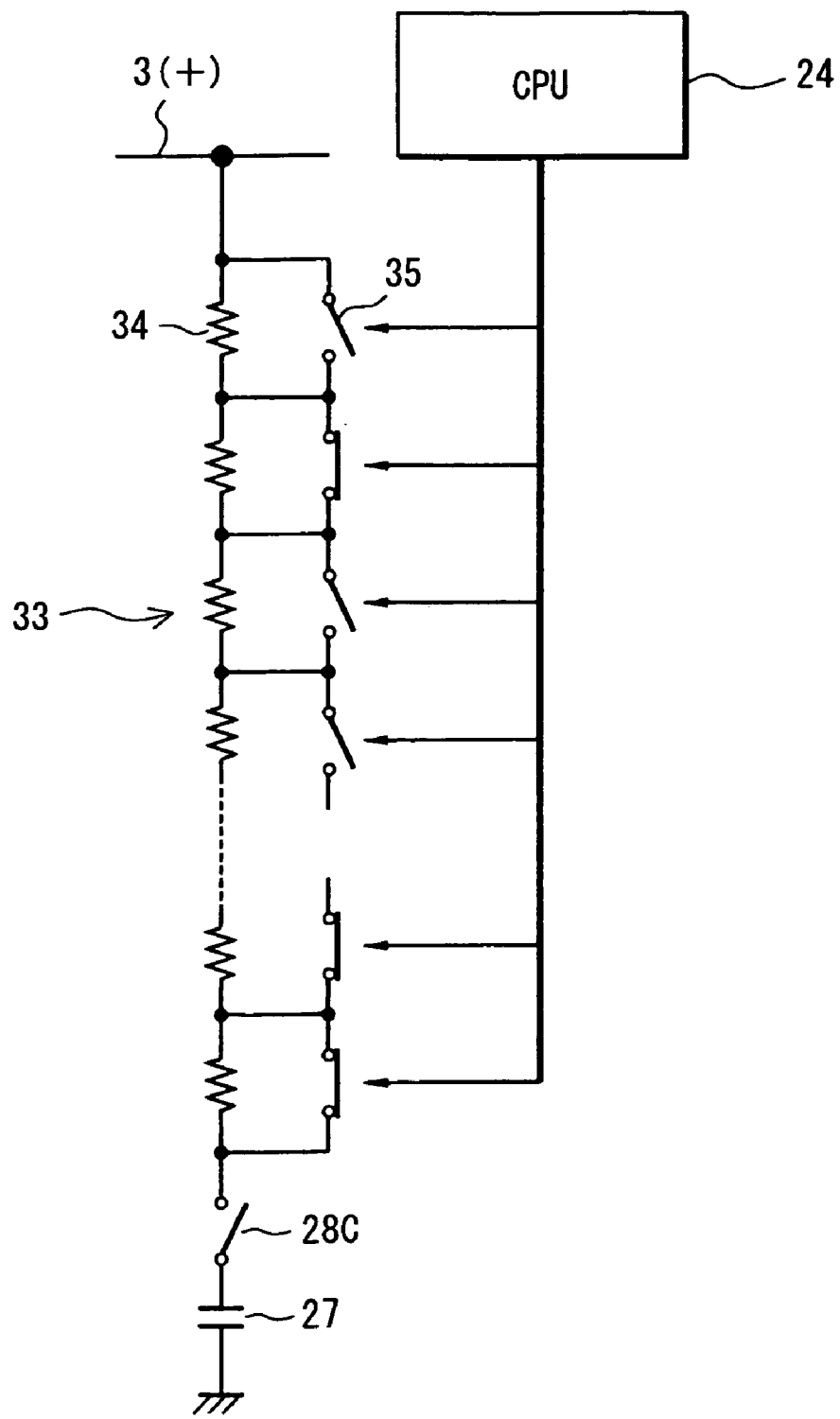
FIG. 13 is a circuit diagram illustrating a charging time constant circuit according to a sixth embodiment of the invention.
Figure 14:
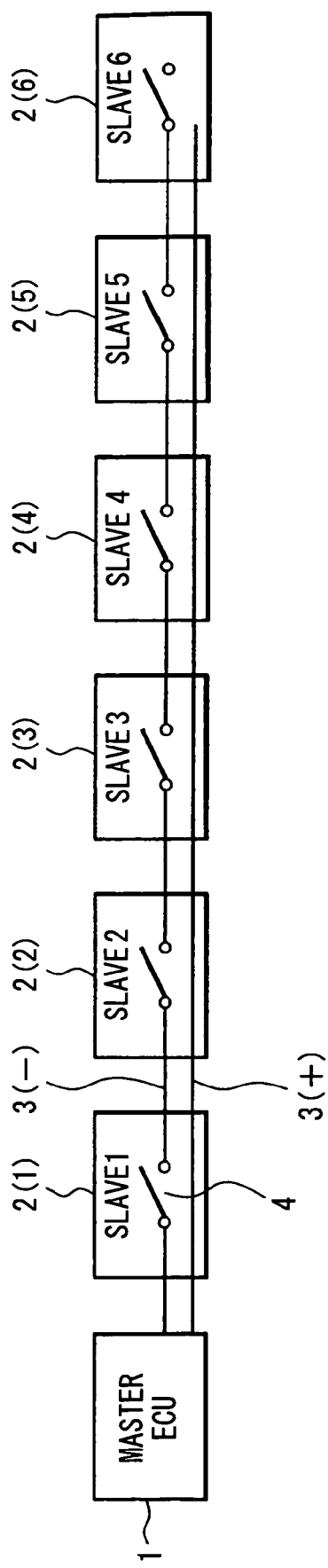
FIG. 14 is a block diagram illustrating a serial communication system in a related art.
Figure 15:
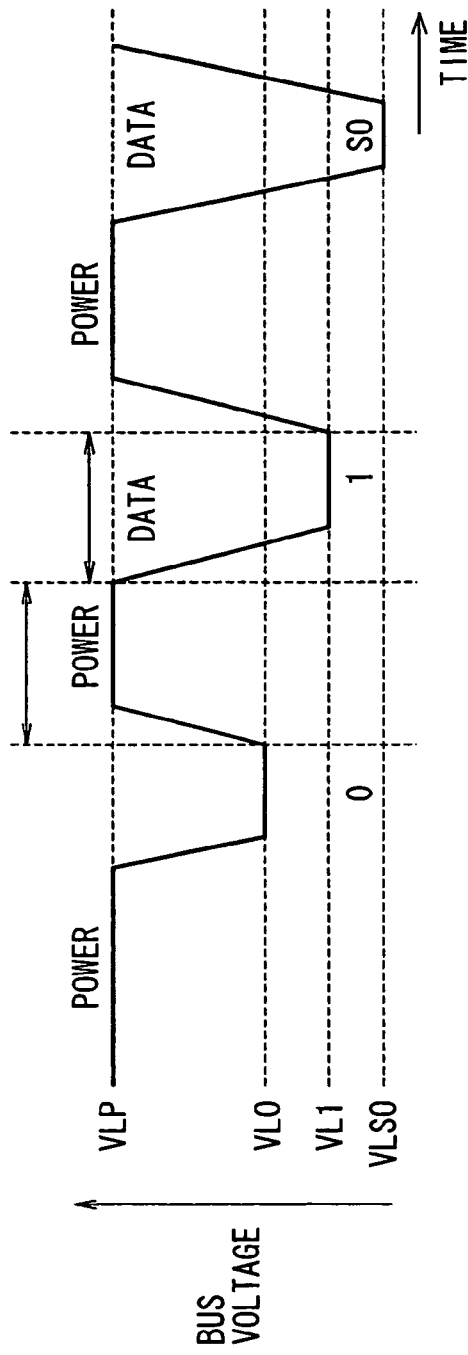
FIG. 15 is a timing chart illustrating voltage waveforms when a master control unit or a slave control unit drives buses in transmitting data by SbW communication.
Figure 16A:
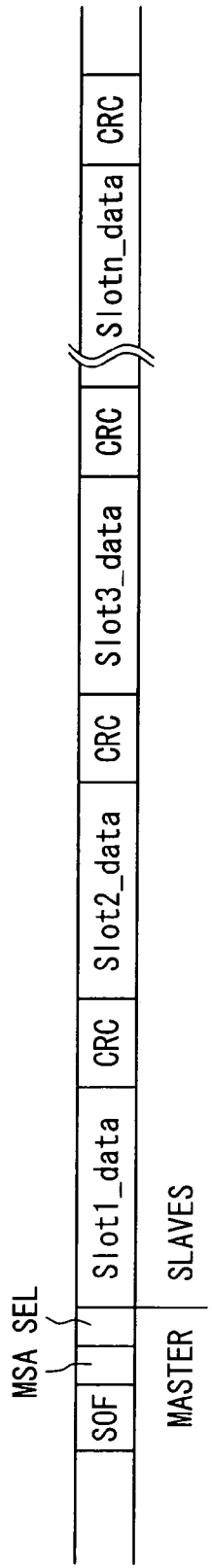
FIGS. 16A and 16B are timing charts illustrating a data communication between the master control unit and the slave control units.
Figure 16B:
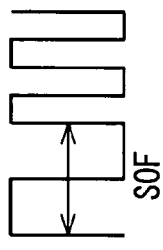
Figure 17:
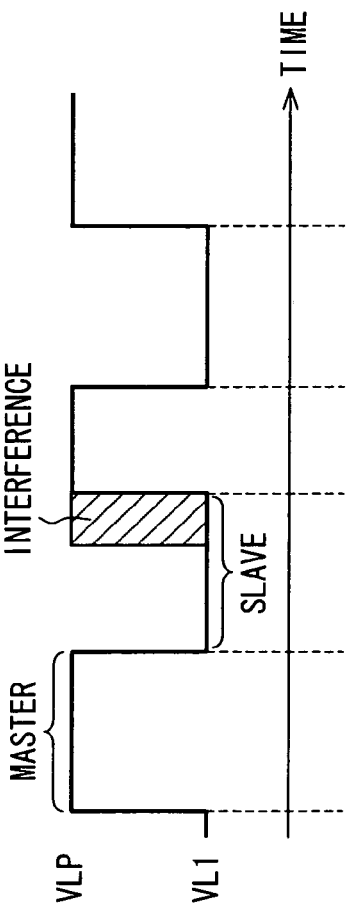
FIG. 17 is a timing diagram illustrating a state where drive levels of the buses are interfering.

In a sixth embodiment, as shown in FIG. 13, a charging time constant circuit 33 uses resistance elements 34 in place of FETs, and parallel circuits of resistance element 34 and switch 35 are connected in a plural number in series between the communication bus 3(+) and the switch 28C of the charging side.

With this construction, the CPU 24 is capable of varying a series resistance by turning the switches 35 on and off. That is, the series resistance increases with an increase in the number of the switches 35 that turn off, and the charging time constant increases. Though not shown, the discharging time constant circuit, too, may be similarly constructed.

The present invention is not limited to the embodiments described above or illustrated in the drawings only, but can be further modified in a manner as described below.

For example, clock signals output by the clock circuit 16 may be corrected for their frequency based on a monitored result of voltages of the buses 3. For example, when the communication rate is fixed, the correction is effected based on an interval in which the drive levels of the buses 3 reach a predetermined level.

Determination of the communication rate is not limited to the one that is based on SOF but may be the one that makes a reference to the communication waveforms transmitted over the buses.

The data value set to the setpoint register 20 may be corrected by the hardware.

The setpoint register 20 may be provided, as required. When the communication rate has been fixed, the data value for setting the non-driving period may be a fixed value, too.

On the side of receiving the data, a coincidence filter may be used twice for determining the data values "0, 1".

The form of connecting the master control unit to a plurality of slave control units through the buses may be in the form of a tree or in the form of a ring.

When the drive levels interfere, the frequency of clock signals output from the clock circuit 16 may be adjusted.

The processing of the fourth embodiment may be applied to the constructions of the first and second embodiments.

In the fourth embodiment, the processings at steps S20 to S22 need not necessarily be executed at the end of the transmission but may be executed at a step where a plurality of data bits are being transmitted.

In the sixth embodiment, series circuits of resistors and switches may be connected in a plural number in parallel.

In the third to sixth embodiments, further, when the communication rate is fixed, there is no need of varying the charging and discharging time constants. The charge and discharge may be changed over upon detecting the terminal voltage of the capacitor 27 that has reached VLP.

Not being limited to the use for air bag devices, the invention can be applied to any communication system that is required to transmit information obtained through a plurality of slave control units to the master control unit.

The communication protocol is not limited to the SbW only. The invention can be applied to any communication protocol provided it executes an asynchronous communication between the master control unit and a plurality of slave control units connected to the master control unit via buses wherein when the master control unit starts the communication, the slave control units transmit a plurality of data bits represented by whether the buses be driven to the master control unit in the data transmission periods assigned to the slave control units based on the start of communication, and the master control unit drives the buses to insert a period for supplying the power while data bits are being transmitted.

What is claimed is:

1. A communication system employing a communication protocol which executes an asynchronous communication, the system comprising:
   a master control unit;
   a plurality of slave control units; and
   buses connecting the master control unit and the slave control units for the asynchronous communication,
   wherein, when the master control unit starts the communication, each slave control unit transmits a plurality of data bits represented by whether the buses be driven to the master control unit in data transmission periods assigned to the slave control units based on a start of communication, and the master control unit repetitively drives the buses to insert power periods for supplying power to the slave control units between the data transmission periods, while data bits are being transmitted in the data transmission periods, and
   wherein each slave control unit provides a non-driving period, which stops driving the buses, at an end of a respective data transmission period, and before a start of a next power period.

2. The communication system according to claim 1,
   wherein, when the master control unit also exhibits setting a communication rate at the start of communication, each slave control unit sets a length of the non-driving period depending on the communication rate.

3. The communication system according to claim 1, further comprising:
an up/down counter, which starts a counting operation from at least a start of its own data transmission period, executes an up-count operation depending upon a period in which the master control unit is supplying the power, and executes a down-count operation depending upon a period of its own data bit transmission period,
wherein driving the buses stops when a value counted down by the up/down counter reaches a threshold value.

4. The communication system according to claim 3,
wherein the slave control unit includes voltage monitoring means for monitoring voltages of the buses, and changes the operation of the up/down counter over to the down-counting when the voltages of the buses decrease down to predetermined levels as a result of discontinuing the supply of the power from the master control unit.

5. The communication system according to claim 4,
wherein the slave control unit detects, for every data bit, a difference in the counted value when the operation of the up/down counter is to be changed over to the down-counting, and transmits information that the current transmission period is abnormal to the master control unit when the difference becomes larger than a predetermined value.

6. The communication system according to claim 1,
wherein the slave control unit includes:
a capacitor that is electrically charged by the power supplied from the master control unit; and
a time constant circuit of which a time constant of when electrically charging the capacitor is larger than a time constant of when electrically discharging the capacitor, and
wherein the slave control unit, during its own data transmission period, electrically charges the capacitor while the master control unit is supplying the power and electrically discharges the capacitor during its own data bit transmission period, and stops driving the buses when the terminal voltage of the capacitor that is discharging becomes smaller than a threshold value.

7. The communication system according to claim 6,
wherein the slave control unit includes voltage monitoring means for monitoring voltages of the buses, and starts electrically discharging the capacitor when the voltages of the buses decrease to predetermined levels as a result of discontinuing the supply of the power from the master control unit.

8. The communication system according to claim 1,
wherein the slave control unit includes voltage monitoring means for monitoring voltages of the buses, and
wherein each slave control unit transmits information that the drive voltage is abnormal to the master control unit, when the drive voltages of the buses monitored by the voltage monitoring means is outside allowable ranges.

9. The communication system according to claim 1,
wherein each slave control unit includes voltage monitoring means for monitoring voltages of the buses, and
wherein each slave control unit transmits an occurrence of a communication error to the master control unit, when the bus voltages are at interfering levels in the data bit transmission period.

10. The communication system according to claim 1,
wherein the slave control unit includes voltage monitoring means for monitoring voltages of the buses, and wherein the slave control unit adjusts the non-driving period to be lengthened when the bus voltages monitored by the voltage monitoring means are at interfering levels in a monitored data bit transmission period.

11. The communication system according to claim 1,
wherein the slave control unit includes current monitoring means for monitoring current flowing in the buses, and transmits an occurrence of a communication error to the master control unit when a level interference has occurred based on a change in the bus current in the one of the data bit transmission periods monitored by the current monitoring means.

12. The communication system according to claim 11,
wherein the slave control unit adjusts the non-driving period to be lengthened when the level interference has occurred based on a change in the bus current in the one of the data bit transmission period monitored by the current monitoring means.

13. The communication system according to claim 10,
wherein the slave control unit transmits the occurrence of a communication error to the master control unit when the length of the non-driving period has exceeded an upper limit as a result of adjusting the non-driving period.

14. The communication system according to claim 1,
wherein each slave control unit includes voltage monitoring means for monitoring voltages of the buses, and
wherein each slave control unit shortens the non-driving period when there continues a state where the drive levels monitored by the voltage monitoring means do not interfere within a monitored data bit transmission period a predetermined number of times.

15. The communication system according to claim 1,
wherein each slave control unit determines the start of its own data transmission period by counting the number of data bits transmitted over the buses from a moment the start of communication is instructed by the master control unit.

16. A communication system employing a communication protocol which executes an asynchronous communication, the system comprising:
a master control unit;
a plurality of slave control units; and
buses connecting the master control unit and the slave control units for the asynchronous communication,
wherein, when the master control unit staffs the communication, each slave control unit transmits a plurality of data bits represented by whether the buses be driven to the master control unit in data transmission periods assigned to the slave control units based on a start of communication, and the master control unit repetitively drives the buses to insert power periods for supplying power to the slave control units between the data transmission periods, while data bits are being transmitted in the data transmission periods,
wherein each slave control unit provides a non-driving period, which stops driving the buses, at an end of a respective data transmission period, and before a start of a next power period,
wherein, when the master control unit also exhibits setting a communication rate at the start of communication, each slave control unit sets a length of the non-driving period depending on the communication rate,
wherein each slave control unit includes voltage monitoring means for monitoring voltages of the buses, wherein each slave control unit adjusts the non-driving period to be lengthened when the bus voltages monitored by the voltage monitoring means are at interfering levels in a monitored data bit transmission period, wherein each slave control unit includes current monitoring means for monitoring current flowing in the buses, and transmits an occurrence of a communication error to the master control unit when a level interference has occurred based on a change in the bus current in the one of the data bit transmission periods monitored by the current monitoring means, and wherein each slave control unit adjusts the non-driving period to be lengthened when the level interference has occurred based on a change in the bus current in the one of the data bit transmission periods monitored by the current monitoring means.

* * * * *